United States Patent [19]

Brinckmann et al.

[11] Patent Number: 4,914,283

[45] Date of Patent: Apr. 3, 1990

[54] CIRCUIT ARRANGEMENT FOR EVALUATING THE OUTPUT OF A PHOTODIODE UNIT

[75] Inventors: Willi Brinckmann, Tamm; Siegfried Nestel, Stuttgart, both of Fed. Rep. of Germany

[73] Assignee: Alcatel N.V., Amsterdam, Netherlands

[21] Appl. No.: 302,544

[22] Filed: Jan. 26, 1989

[30] Foreign Application Priority Data

Jan. 28, 1988 [DE] Fed. Rep. of Germany ....... 3802450

[51] Int. Cl.⁴ .................................................. G01J 1/20
[52] U.S. Cl. ............................. 250/206.01; 250/208.4
[58] Field of Search ................ 250/203 R, 203 S, 221, 250/208, 209, 578; 126/425

[56] References Cited

U.S. PATENT DOCUMENTS

| | | | |
|---|---|---|---|
| 4,018,532 | 4/1977 | Fletcher | 250/203 S |
| 4,179,612 | 12/1979 | Smith | 250/203 S |
| 4,355,896 | 10/1982 | Laue | 250/203 S |
| 4,424,801 | 1/1984 | Mori | 126/425 |
| 4,484,565 | 11/1984 | Mori | 126/425 |
| 4,495,408 | 1/1985 | Mori | 250/203 R |
| 4,672,191 | 6/1987 | Cofield | 250/203 S |

FOREIGN PATENT DOCUMENTS 2931818 2/1981 Fed. Rep. of Germany .

*Primary Examiner*—David C. Nelms
*Assistant Examiner*—Stephone B. Allen
*Attorney, Agent, or Firm*—Christie, Parker & Hale

[57] ABSTRACT

The intensity of the optical radiation varies within a wide range. The proportion of parasitic radiation registered by the photodiodes (D1 to Dn) increases with increasing radiation intensity. To exclude this parasitic radiation from evaluation, the photodiodes (D1 to Dn) are followed by analog comparators (K1 to Kn) with a variable reference voltage (Uref1). The reference voltage (Uref1) is varied by an analog comparator (Kz1) in porportion to the radiation intensity determined by a central photodiode (Dz).

4 Claims, 3 Drawing Sheets

CIRCUIT ARRANGEMENT FOR EVALUATING THE OUTPUT OF A PHOTODIODE UNIT

TECHNICAL FIELD

The present invention relates to a circuit arrangement having an array of photodiodes for determining the direction of incidence of optical radiation.

CLAIM FOR PRIORITY

This application is based on and claims priority from an application first filed in Fed. Rep. Germany on 01/28/88 under Ser. No. P38 02 450.0. To the extent such prior application may contain any additional information that might be of any assistance in the use and understanding of the invention claimed herein, it is hereby incorporated by reference.

BACKGROUND ART

A device for determining the direction of incidence of optical radiation which uses a photodiode unit consisting of a linear array of photodiodes contained in a light-tight box is disclosed, for example, in DE-OS published German patent application No. 29 31 818. The wall of the box opposite the the photodiode unit contains a slit extending transversely to the photodiode array or a suitable lens by which radiation incident within a predetermined angular range is focused onto an area of the photodiode unit corresponding to the angle of incidence. A subsequent circuit evaluates the signals delivered by the photodiodes. The problems caused by large differences in radiation intensity, crosstalk between adjacent photodiodes, and parasitic radiation are not dealt with.

DISCLOSURE OF INVENTION

It is the object of the present invention to provide an arrangement which ensures precise determination of the direction of incidence of optical radiation over a wide intensity range.

In accordance with the invention, the photodiodes are followed by analog comparators coupled to a common reference voltage which is varied in proportion to the radiation intensity determined by a central photodiode.

The principal advantages of the invention are that the signals provided by the photodiodes are evaluated in accordance with the radiation intensity and, according to a further aspect of the invention, that when the sensitivity range of the photodiodes is exceeded, switchover is automatically effected to a range of lower sensitivity.

BRIEF DESCRIPTION OF DRAWINGS

An embodiment of the invention will now be explained with reference to the accompanying drawings, in which.

BEST MODE FOR CARRYING OUT THE INVENTION

Figure 1:
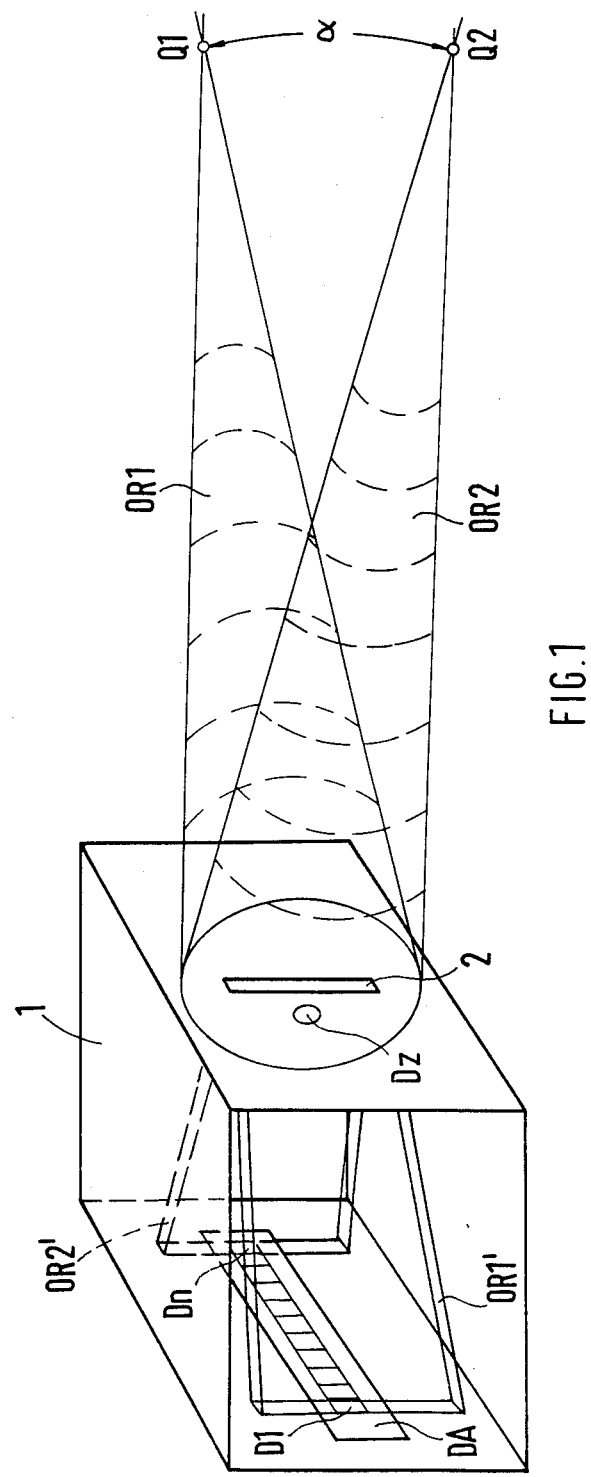
FIG. 1 is a schematic representation of a device for determining the direction of incidence of optical radiation.

FIG. 1 is a perspective, schematic view of a device for determining the direction of incidence of optical radiation as is essentially known from DE-OS 26 03 578. The device is constituted by a light-tight box 1 whose inside has a low-reflection, e.g. mat black, surface. (The sidewall facing the viewer has been removed to show the interior). The front of the box 1 has a vertical slit 2. Inside the box 1, a photodiode unit DA is mounted transversely to this slit 2 on the wall opposite the front. It consists of a linear array of closely spaced photodiodes D1 to Dn.

When optical radiation OR1 or OR2 is incident on the front of the box 1 as shown schematically in FIG. 1, a narrow portion of the radiation corresponding to the width of the slit 2, i.e., a portion OR1' or OR2', respectively, will fall on preferably one of the photodiodes D1 to Dn.

The photodiodes D1 to Dn are assigned certain angular ranges, so that when a photodiode responds to incident radiation OR1 or OR2, the angle of incidence of the radiation and, thus, the direction of the associated radiation source Q1 or Q2 can be derived. The maximum angle of view $\alpha$ is determined essentially by the depth of the box 1 and the length of the photodiode unit DA.

Depending on the distance between the device of FIG. 1 and the respective radiation source Q1, Q2, the intensity of the radiation portion OR1', OR2' incident on the photodiode D1, Dn will be different. In addition, the intensity distribution over the cross section is typically a Gaussian distribution. Depending on whether the slit 2 is struck by the radiation OR1, OR2 completely, as shown schematically in FIG. 1, or only in part, the intensities of the radiation portions incident on the photodiodes D1 to Dn will differ widely even if the radiation sources are located at the same distance from the device. Furthermore, when passing through the slit 2, the radiation undergoes diffraction, which increases with increasing radiation intensity. The radiation portions OR1', OR2' incident on the photodiodes D1, Dn may thus be considerably wider than a photodiode. In conjunction with additional electrical and/or optical crosstalk and/or due to reflection within the box, this effect leads to output signals which permit unambiguous evaluation only within a limited intensity range of the radiation unless special steps are taken.

Accordingly, a circuit had to be provided which, taking account of the dynamics of the radiation acting on the photodiodes D1 to Dn and of spurious side effects, ensures unambiguous determination of the direction of incidence of radiation and has an evaluation range several times as wide as in conventional designs.

Figure 2:
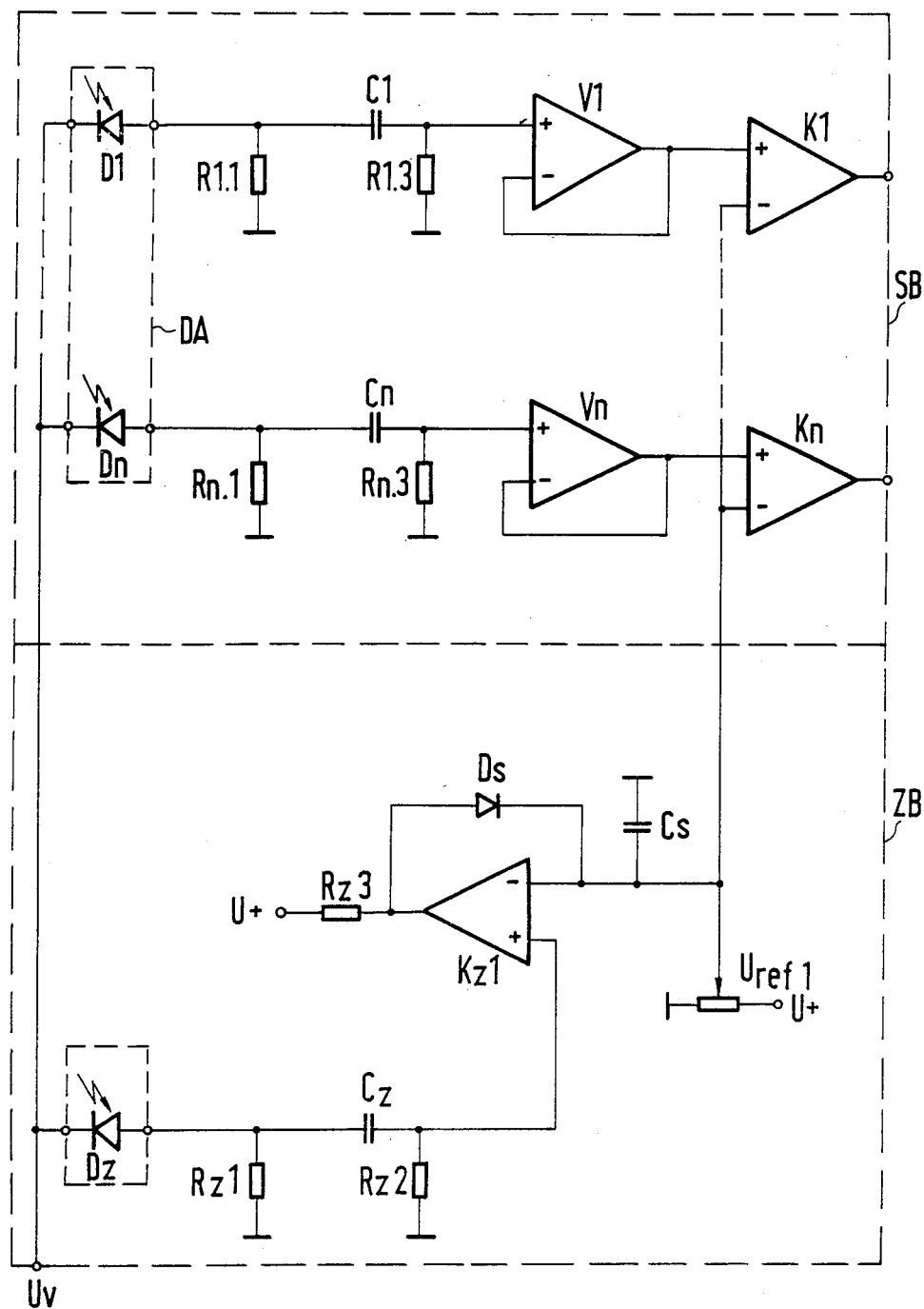
FIG. 2 is a schematic diagram of a circuit arrangement in accordance with the invention.
Figure 3:
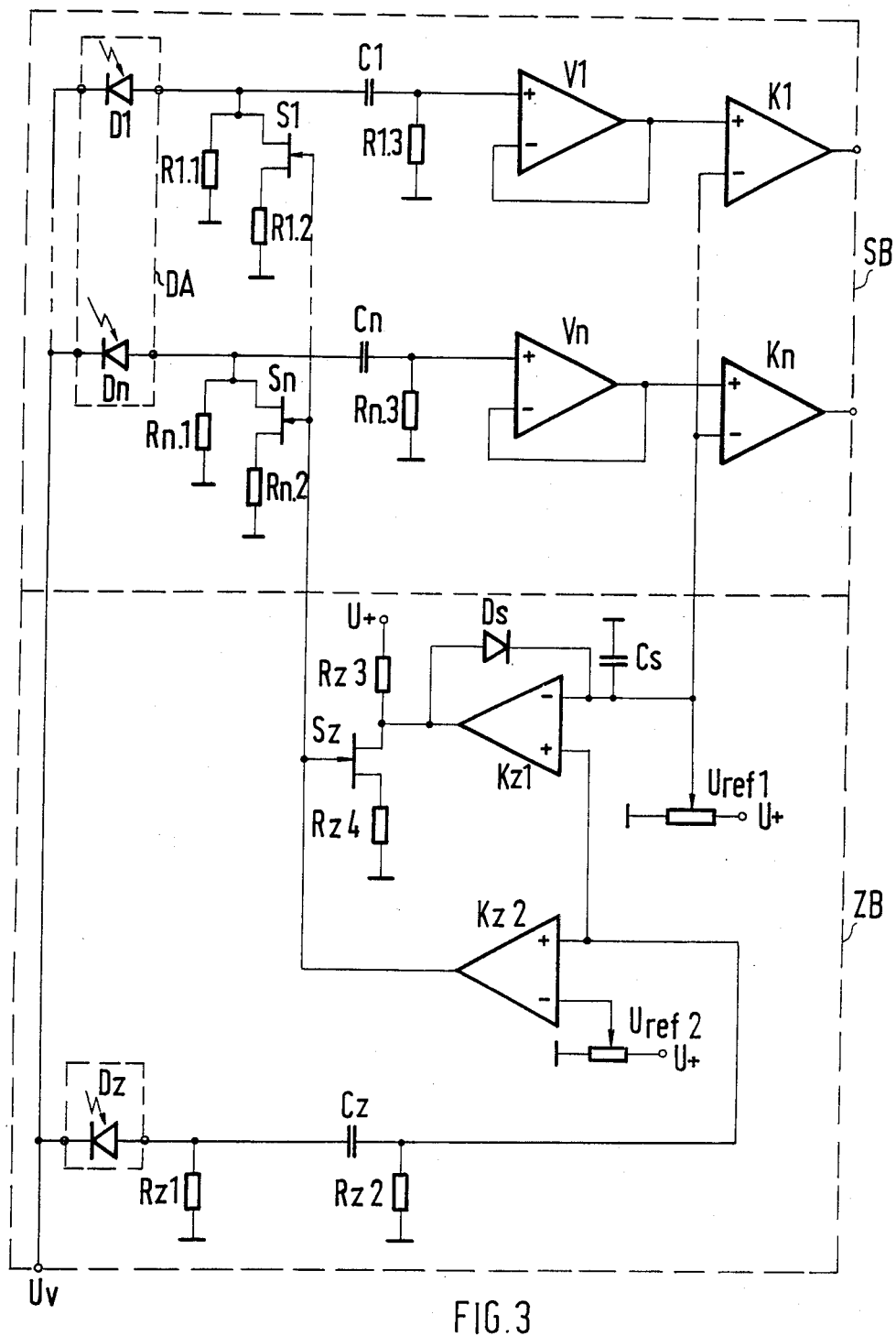
FIG. 3 shows an extended version of the circuit arrangement of FIG. 2 with automatic switchover of the sensitivity range of the photodiodes.

Two such circuits are shown in FIGS. 2 and 3. Each of them consists of a signal portion SB and a central portion ZB. The signal portion SB contains the photodiode unit DA with the photodiodes D1 to Dn and signal channels following the photodiodes. The central portion ZB contains a central photodiode Dz followed by a central channel. The central diode Dz is disposed so that its field of view is equal to the field of view of the photodiode unit DA (angle of view $\alpha$ in FIG. 1). The inputs of the photodiodes D1 to Dn and Dz are connected to a bias voltage Uv.

As shown in FIG. 2, each signal channel contains a load resistor R1·1, ..., Rn·1, a high-pass filter C1/R1·3, ..., Cn/Rn·3, an operational amplifier V1, ..., Vn, and an analog comparator K1, ..., Kn. The analog comparators are preferably operational amplifiers used as differential amplifiers whose inverting inputs are connected to a reference voltage Uref1. The outputs of the comparators K1 to Kn are connected to a processor-controlled signal evaluation unit (not shown). The central channel contains a load resistor Rz 1, a high-pass filter Cz/Rz 2, and an analog comparator Kz1, preferably an operational amplifier used as a differential amplifier, whose output is connected to positive potential U+ through a load resistor Rz3. The output of the comparator Kz1 is fed through a diode Ds back to the inverting input, which is connected to the reference voltage Uref1. A storage capacitor Cs has one terminal connected to the reference-voltage lead running to the comparator Kz1, and the other grounded. The values of the load resistors R1·1 to Rn·1 are chosen so that the basic sensitivity of the photodiodes D1 to Dn is high, so that they already respond to optical radiation of low intensity. The following highpass filters C1/R1·3 to Cn/Rn·3 are designed to filter out continuous radiation or pulses of long duration, so that only the short-duration radiation pulses of interest will be evaluated. The amplifiers V1 to Vn are designed to raise the signal level linearly to a level related to the reference voltage Uref1. While the high-pass filter Cz/Rz 2 in the central channel is identical to the high-pass filters in the signal channels, the value of the load resistor Rz 1 is chosen so that the basic sensitivity of the central diode Dz is lower than that of the photodiodes D1 to Dn.

As described above, the central diode Dz covers a field equal to the total field of view of the photodiodes D1 to Dn. The central diode Dz is therefore located close to the slit 2 as shown in FIG. 1, so that a radiation pulse a portion of which falls on any of the photodiodes D1 to Dn will strike the central photodiode Dz completely. Because of the aforementioned diffraction of the radiation portion passing through the slit 2 (FIG. 1), the electrical and/or optical crosstalk, and the reflection within the box, not only the directly illuminated photodiode D1, Dn but, as a rule, also adjacent photodiodes will respond, depending on the intensity of the radiation pulse. This parasitic radiation, in response to which the signal channels following those adjacent photodiodes deliver voltage pulses of different magnitude, is evaluated by the analog comparators K1 to Kn. The latter, however, respond only to voltage values above the applied reference voltage Uref1. This reference voltage Uref1 is chosen so that a maximum of two, generally adjacent, comparators K1 to Kn will respond, whose output signals are weighted by the subsequent evaluation unit and from which the exact angle of incidence of the radiation pulse is determined, e.g., by interpolation.

The intensity of the parasitic radiation increases with increasing intensity of the radiation pulses. Before the parasitic radiation reaches the order of magnitude of the reference voltage Uref1, the central photodiode Dz, in response to the incident radiation, delivers a voltage greater than the reference voltage Uref1. As a result, the analog comparator Kz1 responds as long as the increased voltage is applied, its output voltage varying in proportion to the difference between the output potential of the central photodiode Dz and the reference voltage. The output voltage, which thus varies proportionally with the intensity of the detected radiation pulse, is fed back to the inverting input of the comparator Kz1 through the diode Ds. By being superimposed on the fixed reference voltage Uref1, it becomes the new reference voltage for the analog comparators K1 to Kn. Because of the short radiation pulses, the storage capacitor Cs is charged to temporarily maintain the increased reference voltage. By the new reference voltage, which varies proportionally with the radiation intensity, the thresholds of the comparators K1 to Kn are raised to such a level that signals caused by parasitic radiation continue to be suppressed.

The radiation pulses to be detected may exhibit dynamics which go far beyond the sensitivity range of the photodiodes D1 to Dn, which is determined by the preset high basic sensitivity and the upper sensitivity limit. If no special steps are taken, only a part of the range of variation of the radiation pulses can be covered with a photodiode unit DA, so that radiation pulses of low intensity, for example, will not be detected because the comparators K1 to Kn will not respond, In the presence of high-intensity radiation pulses, signal voltages caused by parasitic radiation may become higher than the threshold voltages of the associated comparators K1 to Kn, so that the latter will respond. In that case, precise determination of the angle of incidence of the associated radiation pulses is no longer ensured.

FIG. 3 shows an extended version of the circuit arrangement of FIG. 2 in which the sensitivity range of the photodiodes D1 to Dn is shifted within the range of variation of the incident radiation by switching to a lower basic sensitivity so that radiation pulses of higher intensity will also be reliably evaluated. To this end, a resistor R1·2, Rn·2 can be connected in parallel with each of the load resistors R1·1 to Rn·1 of the photodiodes D1 to Dn via an electronic switch S1, Sn. The central portion ZB includes a second comparator Kz2 which, like the first comparator Kz1, has its noninverting input connected to the output of the central photodiode Dz. The inverting input of the comparator Kz2 is connected to a reference voltage Uref2 which causes the comparator Kz2 to respond to a signal from the central photodiode Dz only if and as long as the intensity of the detected radiation pulse reaches or exceeds the upper sensitivity limit of the photodiodes D1 to Dn. Connected to the output of the first comparator Kz1 is an electronic switch Sz in series with a grounded resistor Rz4. In the ON state of the switch Sz, the two resistors Rz3 and Rz4 form a voltage divider via which the operating point of the first comparator Kz1 is changed.

As the second comparator Kz2 responds, the switches S1 to Sn and Sz turn on. In this state, the load resistances of the photodiodes D1 to Dn consist of the parallel combination of the resistors R1·1 and R1·2 to Rn·1 and Rn·2. The resulting resistances are equal and such that the sensitivity range of the photodiodes D1 to Dn is shifted within the dynamic range of the radiation to be detected, as described above. At the same time, the output voltage of the first comparator Kz1, which is also the reference voltage for the analog comparators K1 to Kn, is reduced via the voltage divider Rz3/Rz4 in such a way that the thresholds of the comparators K1 to Kn are lowered in proportion to the decrease in the sensitivity of the photodiodes D1 to Dn.

We claim:
1. A circuit arrangement for determining the angle of incidence of optical radiation, comprising
a plurality of closely spaced photodiodes which each have a respective individual field of view corre- sponding to optical radiation having a different respective range of said angle of incidence, central photodiode means having a combined field of view which includes all said individual fields of view, a plurality of analog comparators, each having an input coupled to a respective one of the outputs from said plurality of photodiodes, a second input of each of the analog comparators being coupled to a common reference voltage, a first analog comparator having an input coupled to the central photodiode means and a second input also coupled to the common reference voltage, reference control means responsive to the output from the central photodiode means, for varying said common reference voltage in accordance with the intensity of radiation detected by the central photodiode.

2. A circuit arrangement as claimed in claim 1, wherein
at least the first analog comparator comprises a respective operational amplifier functioning as a differential amplifier having an inverting input and a non-inverting input, with the common reference voltage being coupled to the inverting input, and said reference control means comprises a diode for feeding the output of that differential amplifier back to the inverting input thereof and a storage capacitor coupled between said inverting input and a fixed potential.

3. A circuit arrangement as claimed in claim 1, wherein the output from the central photodiode means is also coupled to an input of a second comparator having a second input coupled to a second reference voltage, an output of the second comparator is connected to respective control inputs of a plurality of electronic switches each respectively associated with a different one of the plurality of photodiodes, such that when the second comparator responds to a signal from the central photodiode means indicative of a level of incident optical radiation above a predetermined upper threshold, the plurality of electronic switches all assume a first state, a plurality of load resistors are each coupled to a respective one of said plurality of electronic switches and to a respective one of the plurality of photodiodes such that the effective sensitivity of the respective photodiode is lowered when the respective switch assumes said first state, and the output voltage of the first analog comparator is also responsive to the output of said second comparator, such that when said effective sensitivity is lowered, a corresponding change is also made in said first reference voltage.

4. The circuit arrangement of claim 1, wherein
said plurality of closely spaced photodiodes are arranged in a linear array extending in the direction of a first axis, said array is disposed behind a surface parallel to said first axis, said surface defines a slit extending in the direction of a second axis, perpendicular to said first axis said optical radiation passes through said slit before it illuminates said array, and said central photodiode means comprises a photodiode located in front of said surface adjacent to said slit.

* * * * *